United States Patent [19]

Nishida

[11] Patent Number: 5,185,405
[45] Date of Patent: Feb. 9, 1993

[54] RESIN COMPOSTIONS FOR ELECTROPHOTOGRAPHIC TONER

[75] Inventor: Masaharu Nishida, Takatsuki, Japan

[73] Assignee: Sanyo Chemical Industries, Ltd., Kyoto, Japan

[21] Appl. No.: 525,026

[22] Filed: May 18, 1990

[30] Foreign Application Priority Data

May 24, 1989 [JP] Japan ................... 1-131194

[51] Int. Cl.$^5$ .................. C08L 33/08; C08L 25/14
[52] U.S. Cl. .................. 525/228; 525/309; 526/232.3; 524/523; 430/137
[58] Field of Search .................. 525/228, 309; 526/232.3

[56] References Cited

U.S. PATENT DOCUMENTS

| | | |
|---|---|---|
| 3,341,507 | 9/1967 | Guillet et al. ............ 526/209 |
| 3,687,867 | 8/1972 | Lewis et al. ............ 526/232.3 |
| 3,933,665 | 1/1976 | Van Engeland et al. ....... 525/228 |
| 4,165,308 | 8/1979 | Serlin ............ 525/228 |
| 4,705,888 | 11/1987 | Meijer et al. ............ 526/232.3 |

FOREIGN PATENT DOCUMENTS

| | | |
|---|---|---|
| 0072176 | 2/1982 | European Pat. Off. . |
| 52-000797 | 1/1977 | Japan . |
| 52-042834 | 10/1977 | Japan . |
| 54-107994A | 8/1979 | Japan . |
| 62-054749 | 3/1987 | Japan . |
| 801036 | 9/1958 | United Kingdom . |
| 2074591 | 11/1981 | United Kingdom . |

*Primary Examiner*—Carman J. Seccuro, Jr.
*Attorney, Agent, or Firm*—Oblon, Spivak, McClelland, Maier & Neustadt

[57] ABSTRACT

Resin compositions, comprising a high molecular weight copolymer having a molecular weight of at least 300,000, obtained by copolymerizing a styrenic monomer and an acrylic or methacrylic monomer, with or without another monomer, in the presence of a polyfunctional polymerization initiator, have wide molecular weight distribution and are suitable as binders for electrophotographic toners.

25 Claims, No Drawings

RESIN COMPOSTIONS FOR ELECTROPHOTOGRAPHIC TONER

BACKGROUND OF THE INVENTION

1. Field of the Invention

This invention relates to resin compositions suitable for toner. More particularly, it relates to resin compositions suitable as binder for electrophotographic toner.

2. Description of the Prior Art

In electrophotography (xerography), there, have been widely used methods using a heated roller for fixing electrostatic latent images, visualized with use of a developing toner. In this methods, it is desired that the minimum temperature for fixing (hereinafter referred to as MF) is low and the temperature causing offset to the heated roller (hereinafter referred to as HO) is high. In order to meet these two requirements, there have been heretofore proposed various toner binders having wide range of molecular weight distribution from lower molecular weight to higher molecular weight (such as JPN Patent Publications No 20411/1985 and No.23354/1976). In these techniques, there are drawbacks, that use of crosslinking agents to obtain higher molecular weight results in higher MF, and that without using crosslinking agents it is difficult to obtain required higher molecular weight and to attain sufficient HO.

SUMMARY OF THE INVENTION

It is an object of the present invention to provide a resin composition having wide molecular weight distribution.

It is another object of the present invention to provide a toner binder capable of providing a toner having desired properties of low MF and high HO.

It is still another object of the present invention to provide a process for producing a resin composition having wide molecular weight distribution.

It is yet another object of the present invention to provide a method of fixing a toner image capable of providing low MF and high HO.

Briefly, these and other objects of this invention as hereinafter will become more readily apparent have been attained broadly by a resin composition suitable for electrophotographic toner, which comprises a high molecular weight copolymer [A] having a molecular weight of at least 300,000, obtained by copolymerizing (a) at least one styrenic monomer and (b) at least one acrylic or methacrylic monomer, with or without (c) at least one other monomer, in the presence of at least one polyfunctional polymerization initiator.

DETAILED DESCRIPTION OF THE PREFERRED EMBODIMENTS

Suitable polyfunctional polymerization initiators used in this invention include those having at least two peroxide groups, and those having at least one peroxide group and at least one polymerisable unsaturated group.

Polyfunctional polymerization initiators having at least two peroxide groups include, for example, those represented by the general formula (1).

$$A\text{---}[(CO)_p OOR]_m \tag{1}$$

In the formula (1), R is an alkyl group containing 1-8 carbon atoms; m is an integer of 2-4; p is 0 or 1; and A is a polyvalent organic group containing at least 4 carbon atoms. Among said alkyl groups (R), preferred are t-butyl. Examples of said polyvalent organic group are aliphatic hydrocarbon groups (including alkylene, alkenylene and alkynylene groups), containing usually 2-10 (preferably 4-8) carbon atoms, such as butylene, trimethyl-butylene, hexylene, dimethyl-hexylene, octylene and dimethyl-hexynylene groups; cycloaliphatic hydrocarbon groups, containing usually 6-20 (preferably 6-15) carbon atoms, such as cyclohexylene and trimethyl-cyclohexylene groups, and

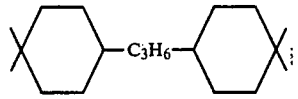

aromatic hydrocarbon groups, containing usually 6-20 (preferably 6-15) carbon atoms, such as —C₃H₆-phenylene-C₃H₆—; heterocyclic groups, such as triazine ring; and aliphatic hydrocarbon group, containing usually 4-20 (preferably 6-15) carbon atoms and one or more linkages selected from ester and ether linkages, such as $C_2$-$C_8$ alkylene groups substituted with —COOR' or —OR' (R': $C_1$—$C_8$ alkyl group), and the like. Illustrative of polyfunctional polymerization initiators having at least two peroxide groups are 1,1-di-t butylperoxy-3,3,5-trimethyl cyclohexane, 1,3-bis-(t-butylperoxy-isopropyl)-benzene, 2,5-dimethyl-2,5-di-(t-butylperoxy)-hexane, 2,5-dimethyl2,5-di-(t-butylperoxy)hexyne-3, tris-(t-butylperoxy)-triazine, 1,1-di-t-butylperoxycyclohexane, 2,2-di-(t-butylperoxy)-butane, 4,4-di-t butylperoxy-valeric acid n-butyl ester, di-t-butylperoxy hexahydroterephthalate, di-t-butylperoxy azelate, di-t-butylperoxy trimethyladipate, 2,2-bis-(4,4-di-t-butylperoxy cyclohexyl)propane, 2,2-di-t-butylperoxy octane, polymer peroxides, and the like. Among these, preferred are 1,1-di-t-butylperoxy-3,3,5-trimethylcyclohexane, 1,1-di-t-butylperoxy-cyclohexane, di-t-butylperoxy azelate and 2,2-bis-(4,4-di-t-butylperoxy cyclohexyl)propane.

Polyfunctional polymerization initiators having at least one peroxide group and at least one polymerisable unsaturated group include, for example, those represented by the general formula (2).

$$R_1\text{---}OO\text{---}CO\text{---}(O)_p(CH_2)_n\text{---}CH\text{=}CH\text{---}R_2 \tag{2}$$

In the formula (2), $R_1$ is an alkyl group containing 1-8 carbon atoms or $R_2$—CH=CH—CH₂)ₙ(O)ₚ—CO—; p is 0 or 1; n is an integer of 0-8; $R_2$ is H, —COOH or —COOR'; and R' is an alkyl group containing 1-8 carbon atoms. Examples of said alkyl groups R1 and R' are iso-propyl and t-butyl groups. Illustrative examples of polyfunctional polymerization initiators having at least one peroxide group and at least one polymerisable unsaturated group include diallyl peroxy carbonate, t-butyl peroxy maleic acid, t-butyl-peroxy allyl carbonate and t-butyl-peroxy iso-propyl fumarate. Among these, preferred is t-butylperoxy allyl carbonate.

Suitable styrenic monomer (a) include, for example, those represented by the formula (3).

In the formula (3), $R_3$, $R_4$ and $R_5$ are independently selected from the group consisting of hydrogen and lower alkyl; $R_6$ is selected from the group consisting of hydrogen, $C_1$–$C_{10}$ alkyl, phenyl, lower alkoxy and halogen; Ar is an aromatic hydrocarbon group (such as phenylene); and q is an integer of 0–3. Exemplary of said monomers (a) are styrene; and styrene homologues or substituted styrenes, including alkyl($C_1$–$C_8$)styrenes (such as alphamethylstyrene, o-, m- and p-methylstyrenes, p-ethylstyrene, 2,4 dimethylstyrene, p-n-butylstyrene, p-t-butylstyrene, p-n-hexylstyrene, p-n-octylstyrene, p-n-nonylstyrene. p-n-decylstyrene, aryl-substituted styrenes (such as p-phenylstyrene), alkoxy-substituted styrenes (such as p methoxystyrene), halogen-substituted styrenes (such as p-chlorostyrene, 3,4-dichlorostyrene); and mixtures of two or more of them (such as mixtures of styrene with one or more styrene homologues). Among these, preferred is styrene.

Suitable acrylic or methacrylic monomer (b) include esters of (meth)acrylic acids [acrylic acid and methacrylic acid; similar expressions are used hereinafter], for example, alkyl($C_1$–$C_{18}$) (meth)acrylates, such as methyl, ethyl, n- and i- butyl, propyl, n-octyl, 2-ethylhexyl, dodecyl, lauryl and stearyl (meth)acrylates: aryl (meth)acrylates, such as phenyl (meth)acrylates hydroxyl-containing (meth)acrylates, such as hydroxyethyl (meth)acrylates; amino-containing (meth)acrylates, such as dimethylaminoethyl and diethylamlnoethyl (meth)acrylates; epoxy-containing (meth)acrylates, such as glycidyl (meth)acrylates: (meth)acrylic acids and derivatives thereof, such as (meth)acrylonitriles and (meth)-acrylamides: and the like. Among these, preferred are alkyl (meth)acrylates [particularly methyl, ethyl, butyl and 2 ethylhexyl (meth)acrylates] and (meth)acrylic acids, and mixtures of two or more of them.

Suitable other monomers (c), optionally used in producing high molecular weight copolymers in the present invention, include, for example, vinyl esters, such as vinyl acetate and vinyl propionate: alihpatic hydrocarbon monomers, such as butadiene: vinyl ethers, such as vinylmethyl ether, vinylethyl ether and vinyl-iso-butyl ether; vinyl ketones, such as vinylmethyl ketone, vinylhexyl ketone and methylisopropenyl ketone; N-vinyl compounds, such as N-vinylpyrrole, N-vinylcarbazole, N-vinylindole and N-vinylpyrrolidine; and the like. Among these, preferred are vinyl esters and alihpatic hydrocarbon monomers.

In addition to said monomers (a) and (b) and optionally (c), at least one polyfunctional monomer (d), containing at least two polymerizable double bonds may also be used within the scope of the invention, in such an amount not causing gellation. Illustrative of monomers (d) are di or poly vinyl compounds, for example, aromatic dior poly-vinyl compounds, such as divinylbenzene and divinyltoluene; di or poly-(meth)acrylates of polyols, such as ethyleneglycol di(meth)acrylates, 1,6 hexanediol di(meth)acrylates; and so on. Among these, preferred are divinylbenzene and 1,6 hexanediol diacrylate.

In producing high molecular weight copolymers in this invention, the contents of said monomers (a), (b), (c) and (d) can be varied widely, but the usual ranges are as follows, based on the total monomers:

|     | generally | preferably |
| --- | --- | --- |
| (a) | at least 50% by weight, | at least 60% by weight; |
| (b) | at least 2% by weight, | at least 5% by weight; |
| (c) | 0–10% by weight, | 0–5% by weight; and |
| (d) | at most 0.1 mole %, | at most 0.05 mole %. |

Said high molecular weight copolymer [A] can be produced by copolymerizing said monomers (a) and (b) with or without said monomers (c) and/or (d). in the presence of at least one polyfunctional polymerization initiator, using any known polymerization techniques, such as solution polymerization, bulk polymerization, suspension polymerization and emulsion polymerization, and combinations of them (such as solution polymerization followed by suspension or bulk polymerization, or suspension polymerization followed by solution or bulk polymerization).

The amount of said polyfunctional polymerization initiator can vary widely, but is generally 0.02–1.0%, preferably 0.03–0.8 %, based on the total weight of the monomers.

Suitable solvents, used in solution polymerization, include, for example, cycloalkanes, such as cyclohexane; aromatic hydrocarbons, such as benzene, toluene, xylene, ethylbenzene and cumene; esters, such as ethyl acetate and butyl acetate: ethers, such as methylcellosolve, ethylcellosolve and butylcellosolve; and the like. Among these, preferred are cycloalkanes and aromatic hydrocarbons, in order to obtain higher molecular weight polymers.

Suspension polymerization can be carried out in an aqueous medium, in the presence of dispersants, for example. inorganic ones, such as calcium carbonate and calcium phospate, and organic ones, such as polyvinylalcohol and methylcellulose.

Polymerization temperature is usually from 50 to 150 degrees C. or higher, preferably from 60 to 120 degrees C. In the last stage of polymerization (for instance, after the degree of conversion has reached 60%), the temperature may be raised to 150 to 200 degrees C. or higher.

It is preferred to carry out polymerization within an atmosphere of inert gas, such as nitrogen.

In carrying out polymerization, monomers may be polymerized simultaneously: or polymerization may be carried out stepwise, that is a part of monomers are polymerized, followed by polymerizing the rest of monomers in admixture with the resulting polymer.

Molecular weight of said high molecular weight copolymers [A], obtained by using said polyfunctional polymerization initiator, in accordance with the invention, may vary widely; but preferred are those having a weight-average molecular weight (Mw), which can be measured by GPC (gel permeation chromatography) using tetrahydrofulan (hereinafter referred to as THF) with use of calibration curve of standard polystyrenes, of at least about 300,000, preferably about 350,000--about 3,000,000 or higher, more preferably about 400,000 –about 2,000,000.

Resin compositions for toner binders, according to this invention, comprising said high molecular weight copolymer [A], may further contain one or more other components.

It is preferred to contain one or more lower molecular weight components, in view of lowering of MF.

Preferable examples of such components include at least one other polymer [B]having lower molecular weight, for example, polymers having Mw of usually about 3,000–about 50,000, such as styrene/acrylic copolymers, polyester resins, polyepoxides resins, polyurethane resins and the like. Among these, preferred are styrene/acrylic copolymers and polyester resins.

In preferred embodiments, said other polymer [B] can be prepared beforehand, separately or simultaneously with the preparation of said high molecular weight polymer. In other words, toner binder resin compositions can be produced by blending in a solution or in a melted state [A] with [B], prepared separately beforehand; or by copolymerizing said monomers (a) and (b) in the presence of [B] and said polyfunctional polymerization initiator. These methods preparing [B] beforehand, separately or simultaneously with [A] can provide resin compositions containing [A] having sufficiently high Mw, without reducing Mw of [A].

In another embodiment, said other polymer [B] may be produced by polymerizing in balk or in solution at least one precursor monomer for [B] in the presence of [A]. For instance, [A] is dissolved in said precursor monomer, followed by polymerizing said precursor monomer to obtain [B]. In polymerizing said precursor monomer of this case, bulk polymerization and solution polymerization, which can remarkably reduce the amount of the polymerization initiator to provide the same molecular weight and therefore can remedy or reduce evil influences (such as extraordinal charging of toner, environmental instability and so on) caused by the presence of the initiator residues, are preferred to suspension polymerization.

In these resin compositions, said other polymer [B] and said high molecular weight copolymer [A] may be merely blended, or may be in bound forms, such as through covalent bond. In these resin compositions, the content of [A] is usually 10–50 by weight, preferably 15–45 %, and that of [B] is generally 50–90% by weight, preferably 55–80%, based on the total weight of these polymers.

Mw of toner binder resin compositions of this invention is usually about 100,000–about 2,000,000, preferably about 150,000–about 1,500,000. When Mw is less than 100,000, it is difficult to obtain sufficient HO; and Mw higher than 2,000,000 results in too high MF. Molecular weight distribution [represented by the ratio of Mw to number-average molecular weight (Mn), that is Mw/Mn] of toner binder resin compositions of thes invention is generally at least about 20, preferably at least about 30. Mw/Mn less than 20 results in poor balance of HO and MF. Glas transition temperature (hereinafter referred to as Tg) of toner binder resin compositions of the invention is generally about 40—about 80 degrees C., preferably about 45—about 70 degrees C. Resin compositions of Tg less than 40 degrees C. provides toner of poor shelf stability; and When Tg is higher than 80 degrees C., MF becomes too high to be used practically as toners.

Toner binder resin compositions of the present invention may contain at least one low molecular weight polyolefin [C]. Mw of said polyolefin [C], which can be measured by GPC using o-dichlorobenzene at 135 degrees C., is generally about 1,000—about 100,000, preferably about 5000—about 60,000. Illustrative of said polyolefin [C] are:

(C1): polyolefins, for example, polyethylene, polypropylene, and copolymers of ethylene with alpha-olefin containing 3–8 carbon atoms (such as ethylenepropylene copolymer containing at least 50%, particularly at least 70% by weight of propylene);

(C2): (C1) modified with [adducts of (C1) with] maleic acid derivative (such as mareic anhydride, dimethyl maleate, diethyl maleate and di-2-ethylhexyl maleate)

(C3): oxydates of (C1):

(C4): copolymers of ethylenically unsaturated hydrocarbon (such as ethylene, propylene, butene 1 and the like) with ethylenically unsaturated carboxylic acid [such as (meth)acrylic acids, itaconic acid and the like] and/or ester thereof (such as $C_1$–$C_{18}$ alkyl esters); and mixtures of two or more of them.

Among the above polyolefins [C], (C1) may be obtained by thermal degradation (thermal decomposition) of high molecular weight polyolefin (Mw: usually about 10,000—about 2,000,000), or by polymerization of one or more olefins. (C2) can be obtained by addition reaction of maleic acid derivative With (C1), in the presence of or in the absence of peroxide catalyst (C2) may be obtained by oxidation of (C1) with oxygen or oxygen-containing gas (such as air) or with ozone containing oxygen or ozone-containing gas (air). Acid value of (C2) is usually at most about 100, preferably at most about 50. (C4) can be obtained copolymerization of ethylenically unsaturated hydrocarbon with ethylenically unsaturated carboxylic acid and/or ester thereof. The amount of ethylenically unsaturated carboxylic acid and/or ester thereof is generally at most about 30%, preferably at most about 20%.

It is preferred that said polyolefin [C] is homogeneously distributed in the resin composition, to obtain excellent release effects. For this purpose, [C] is preferably added during polymerization of monomers (a) and (b).

The amount of said polyolefin [C] is usually at most about 30%, preferably about 1—about 20%, based on the total weight of the toner binder. Use of [C] more than 30% results in insufficient dispersibility.

Electrophotographic toner, wherein the resin composition of the present invention is used as the toner binder, comprises generally about 50—about 95% by weight of the toner binder and may contain one or more of known colorants (inorganic and organic pigments, such as carbon black, iron black, benzidine yellow, quinacridone pigments, rhodamine B, phthalocyanine pigments and the like), in an amount of usually about 5—about 10%; magnetic powders (such as powders of ferromagnetic metals and compounds, such as iron, cobalt, nickel, magnetite, hematite, ferrite and the like), in an amount of generally 0—about 50%; and other additives [for example, charge controllers (such as metal complexes and nigrosine), lubricants (such as polytetrafluoroethylene, low molecular weight polyolefins, fatty acids and metal salts or amides thereof), and so on], in an amount of 0—about 5%.

Said toner can be prepared by dry blending these components and then melted under kneading, followed by crushing, and then finely pulverizing with a grinder (such as jet grinder), thereafter classifying to obtain particles of 50–20 microns diameter.

Said toner can be optionally mixed with one or more carrier particles, such as iron powder, glass beads, nickel powder, ferrite and the like, and used as a developer for electrical latent images. Besides, hydrophobic colloidal silica powder may be used to improve flowability of powders.

Said toner can be fixed on substrates, such as paper, polyester film and the like. Fixation may be accomplished by any known Fixation means, such as heat roll fixation.

Having generally described the invention, a more complete understanding can be obtained by reference to certain specific examples, which are included for purposes of illustration only and not intended to be limiting unless otherwise specified.

In the following examples, parts, ratio and % mean parts by weight, weight ratio and % by weight, respectively.

Conditions of measuring Mw with GPC are as follows:

| | |
|---|---|
| Equipment | HCL-802A, produced by Toyo Soda Manuf. |
| Columns | TSK gel GMH6, 2 columns, produced by Toyo Soda Manuf. |
| Temperature | 25 degrees C. |
| Sample solution | 0.5% THF solution. |
| Amount of solution | 200 microlitters. |
| Detector | Refractometer |

Mw calibration curve was prepared using standard polystyrenes.

EXAMPLE 1

Into a four-necked flask of 1l, were charged 450 parts of water and 50 parts of 2% aqueous solution of polyvinyl alcohol (PVA 235, produced by Kuraray), followed by adding thereto a mixture of 280 parts of styrene, 83 parts of n-butyl acrylate and 1 part of 1,1-di-t-butylperoxy-3,3,5-trimethyloxolohexane to form suspension under stirring. After substituting the atmosphere in the flask thoroughly with nitrogen, the temperature was raised to 80 degrees C. to initiate polymerization. Polymerization was continued maintaining the temperature; and confirming that the conversion reached to 98% after 20 hours, the temperature was raised to 95 degrees C., followed by completing the suspension polymerization after 2 hours. The resulting polymer was filtered off, washed with water and then dried to obtain a polymer (hereinafter referred to as Polymer A-1) having Mw of 1,200,000 and Tg of 60 degrees C.

Meanwhile, 300 parts of xylene were charged into a four-necked flask of 2 l; and, after substituting sufficiently the atmosphere with nitrogen, the temperature was raised to boiling point of xylene (about 140 degrees C.) to reflux it. To this, under reflux of xylene, a mixture of 500 parts of styrene, 120 parts of methyl methacrylate, 47 parts of butyl acrylate and 47 parts of t-butylperoxybenzoate was added dropwise over 4 hours, and further refluxing of xylene was continued for 2 hours to complete the polymerization. The resulting solution is hereinafter referred to as Solution A-2.

To Solution A-2 gas added 333 parts of polymer A-1 and dissolved under reflux of xylene, followed by distilling off xylene to obtain a binder of this invention (hereinafter referred to as Binder A-3).

It was confirmed upon measuring GPC and Tg that Binder A-3 contained 32% of a high molecular weight copolymer having molecular weight of at least 300,000 and had Mw of 250,000 and Tg of 63 degrees C.

EXAMPLE 2

Xylene was distilled off from Solution A 2 in Example 1 to obtain a polymer (hereinafter referred to as polymer B 2). A mixture of 365 parts of styrene, 135 parts of 2 ethylhexyl acrylate and 1.2 parts of di-t-butylperoxyhexahydroterephthalate was added to 500 parts of Polymer B-2 to obtain a homogeneous solution. This solution was suspension polymerized at 80 degrees C. within a glass autoclave in the same manner as in preparation of polymer A-1 in Example 1. When the conversion reached to 90%, the temperature was raised to 120 degrees C., followed by completing the suspension polymerization after 3 hours.

The resulting polymer was filtered off, washed with water and then dried in the same manner as in Example 1 to obtain a binder of this invention (hereinafter referred to as Binder B-3).

It was confirmed upon measuring GPC and Tg that Binder B-3 contained 45% of a high molecular weight copolymer having molecular weight of at least 300,000 and had Mw of 300,000 and Tg of 64 degrees C.

EXAMPLE 3

In the same manner as preparation of Solution A 2 in Example 1, styrene was polymerized to obtain a polymer solution, followed by distilling off xylene to obtain a polymer (hereinafter referred to as Polymer C-2). A mixture of 216 parts of styrene, 84 parts of n-butyl acrylate and 0.5 parts of 2,2-bis(4,4-t-butylperoxy cyclohexyl)propane was added to 300 parts of Polymer C-2 to obtain a homogeneous solution. This solution was charged into a stainless pressure reaction vessel of 2 1, and polymerized at 80 degrees C. after substituting sufficiently with nitrogen. When the conversion reached to 60%, the temperature was raised to 190 degrees C. and 360 parts of styrene and 40 parts of n-butyl acrylate were added dropwise into the reaction vessel over 2 hours, followed by continuing the polymerization for 1 hour and distilling off unreacted monomers to obtain a binder of this invention (hereinafter referred to as Binder C 3).

It was confirmed upon measuring GPC and Tg that Binder C-3 contained 21% of a high molecular weight copolymer having molecular weight of at least 300,000 and had Mw of 280,000 and Tg of 58 degrees C.

EXAMPLE 4

Into a stainless pressure reaction vessel of 2 1, were charged S60 parts of styrene, 140 parts of n-butyl acrylate and 0.25 parts of 2,2-bis(4,4-t butylperoxy)-cyclohexyl-propane, followed by polymerizing them at 110 degrees C. after substituting sufficiently with nitrogen. When the conversion reached to 65%, 100 parts of xylene were added thereto and the temperature was raised to 205 degrees C. over 2 hours. At this temperature, 450 parts of styrene and 50 parts of n-butyl acrylate were added dropwise into the reaction vessel over 6 hours, followed by continuing the polymerization for 2 hour and distilling off unreacted monomers and xylene under reduced pressure to obtain a binder of this invention (hereinafter referred to as Binder D 3).

It was confirmed upon measuring GPC and Tg that Binder D-3 contained 26% of a high molecular weight copolymer having molecular weight of at least 300,000 and had Mw of 250,000 and Tg of 60 degrees C.

COMPARATIVE EXAMPLE 1

Example 1 was repeated, except that a monofunctional polymerization initiator benzoylperoxide Was used instead of the difunctional polymerization initiator 1,1-di-t-butylperoxy-3,3,5-trimethylcyclohexane in the preparation of polymer A-I in Example 1, to obtain a binder (hereinafter referred to as Binder E-3).

It was confirmed upon measuring GPC and Tg that Binder E-3 contained only 5% of a high molecular weight copolymer having molecular weight of at least 300,000 and had Mw of 20,000 and Tg of 65 degrees C.

EXAMPLES I-V 88 parts of each of the binders of Examples 1-4 of this invention and the binder of Comparative Example 1 were mixed homogeneously with 7 parts of carbon black (MA100 produced by Mitsubisi Chemical Industries), 3 parts of a low molecular weight polypropylene (Viscol 550P, produced by Sanyo Chemical Industries) and 2 parts of a charge controller (Spironblack TRH produced by Hodogaya Chemical Co.), and thereafter kneaded with a twin-screw extruder of bulk temperature 150 degrees C., followed by finely pulverizing the cooled kneaded mixture with a jet grinder and then classifying with a dispersion separator to obtain toners of 12 microns diameter (average).

3 parts of each toner were mixed homogeneously with 97 parts of ferrite carrier (EFV 200/300 produced by Nippon Seihun Co.), and fixing test was carried out using a commercially available electrophotographic copy machine (BD-7720 produced by Toshiba Corp.).

The test results were as shown in Table 1.

TABLE 1

| Example | Binder | MF[*1] | HO[*2] |
|---|---|---|---|
| I | A-3 (Example 1) | 160 | more than 220 |
| II | B-3 (Example 2) | 170 | more than 220 |
| III | C-3 (Example 3) | 155 | more than 220 |
| IV | D-3 (Example 4) | 155 | more than 220 |
| V | E-3 (Comparative Example 1) | 155 | 180 |

[Notes]
[*1] the temperature of the heated roller providing printed image density of solid part remained at least 70% after 5 times reciprocating rubbing of black solid part of printed image density 1.2 with a Gakushin fastness tester (rabbed part = paper).
[*2] the temperature of the heated roller at the time when the toner was hot offset.

As shown in Table 1, Toners I, II, III and IV obtained using Binders A-3, B-3, C-3 and D-3 of this invention exhibited wider temperature region between MF and HO and more desirable thermal performance as toner, as compared with Toner V obtained using Binder E-3 for comparison.

Resin compositions according to the present invention have wide molecular weight distribution, and are effective as binders for electrophotographic toners, which can provide desired properties with respect to MF and Ho (low MF and high HO).

We claim:

1. A resin composition suitable for electrophotographic toner, which comprises 10-50% by weight of a high molecular weight copolymer having a molecular weight of at least 300,000, obtained by copolymerizing (a) at least one aromatic vinyl monomer and (b) at least one alpha-methylene aliphatic monocarboxylic ester monomer, with or without (c) at least one other monomer, in the presence of at least one polyfunctional polymerization initiator, selected from the group consisting of a polymerization initiator having at least two peroxide groups and a polymerization initiator having at least one peroxide group and at least one polymerizable unsaturated group, and 50-90% by weight of at least one styrene-acrylic ester copolymer of lower molecular weight; said composition having a molecular weight distribution of at least about 20 and a glass transition temperature of about 40° C.-about 80° C.

2. The composition of claim 1, wherein said initiator is selected from the group consisting of
1) a compound represented by the general formula:

(1)

wherein R is an alkyl group containing 1-8 carbon atoms; m is an integer of 2-4; p is 0 or 1; and A is a polyvalent organic group containing at least 4 carbon atoms selected from aliphatic hydrocarbon group, cycloaliphatic hydrocarbon group, aromatic hydrocarbon group, heterocyclic group, and aliphatic hydrocarbon group containing one or more linkages selected from ester and ether linkages; and 2) a compound represented by the general formula:

(2)

wherein $R_1$ is an alkyl group containing 1-8 carbon atoms or $R_2$—CH=CH—$(CH_2)_n(O)_p$—CO—; p is 0 or 1; n is an integer of 0-8; $R_2$ is H, —COOH or —COOR'; and R' is an alkyl group containing 1-8 carbon atoms.

3. The composition of claim 1, wherein said initiator is selected from the group consisting of 1,1-di-t-butylperoxy-3,3,5-trimethylcyclohexane, 1,3-bis-(t-butylperoxy-iso-propyl)-benzene, 2,5-dimethyl-2,5 di-(t-butylperoxy)-hexane, 2,5-dimethyl-2,5-di-(t-butylperoxy)hexyne-3, tris-(t-butylperoxy)-triazine, 1,1-di-t-butylperoxy-cyclohexane, 2,2-di-t-butylperoxy butane, 4,4-di-t-butylperoxyvaleric acid n-butyl ester, di-t-butylperoxy hexahydroterephthalate, di t-butylperoxy azelate, di-t-butylperoxy trimethyladipate, 2,2-bis (4,4 di-t butylperoxy cyclohexyl)propane, 2,2-(t-butylperoxy)-octane, polymer peroxides, diallyl peroxy-carbonate, t-butylperoxy-maleic acid, t-butylperoxy allyl carbonate and t-butylperoxy isopropyl fumarate.

4. The composition of claim 1, wherein said monomer (a) is styrene.

5. The composition of claim 1, wherein said monomer (b) is at least one monomer selected from the group consisting of acrylic acid esters and methacrylic acid esters.

6. The composition of claim 1, wherein said monomer (c) is at least one monomer selected from the group consisting of aliphatic hydrocarbon monomers, vinyl esters, alphamethylene aliphatic monocarboxylic acid monomers. unsaturated nitriles and polyfunctional monomers containing at least two polymerizable double bonds.

7. The composition of claim 1, wherein said high molecular weight copolymer contains at least 50% by weight of the monomer (a) units, 2-50% by weight of the monomer (b) units, and 0-10% by weight of the monomer (c) units.

8. The composition of claim 1, which comprises 15-45% by weight of said high molecular weight copolymer and 55-80% by weight of at least one other of said copolymer of lower molecular weight.

9. The composition of claim 8, wherein said other copolymer having lower molecular weight is prepared beforehand, separately or simultaneously with the preparation of said high molecular weight polymer.

10. The composition of claim 8, wherein said other copolymer having lower molecular weight is prepared by bulk polymerization or solution polymerization.

11. The composition of claim 1, which has a weight-average molecular weight of about 100,000—about 2,000,000.

12. The composition of claim 1, which has a glass transition temperature of about 45° C. —about 70° C.

13. The composition of claim 1, which further contains up to 30%, based on the Weight of the composition, of at least one low molecular weight polyolefin having a weight-average molecular weight of about 1,000-about 100,000.

14. An electrophotographic toner, comprising 50-95% by weight of the resin composition of claim 11, 5-10% by weight of a colorant, 0-50% by weight of a magnetic powder, and 0-5% by weight of one or more other additives.

15. A process for producing the resin composition of claim 8, which comprises copolymerizing said monomers (a) and (b) in the presence of said other copolymer having lower molecular height and said polyfunctional polymerization initiator.

16. A process for producing the resin composition of claim 8, which comprises copolymerizing said monomers (a) and (b) in the presence of said polyfunctional polymerization initiator, and blending the resulting high molecular weight copolymer with said other copolymer.

17. A process for producing the resin composition of claim 8, which comprises copolymerizing said monomers (a) and (b) in the presence of said polyfunctional polymerization initiator, and polymerizing in bulk or in solution at least one precursor monomer for said other copolymer in the presence of the resulting high molecular weight copolymer.

18. A process for producing the resin composition of claim 13, which comprises blending said high molecular weight copolymer with said low molecular weight polyolefin.

19. A process for producing the resin composition of claim 13, which comprises copolymerizing said monomers (a) and (b) in the presence of said low molecular weight polyolefin and said polyfunctional polymerization initiator.

20. A process for producing the toner of claim 13, which comprises blending said high molecular weight copolymer with said low molecular weight polyolefin and the colorant.

21. A process for producing the toner of claim 13, which comprises copolymerizing said monomers (a) and (b), in the presence of at least one of said low molecular weight polyolefin and the colorant, and in the presence of said polyfunctional polymerization initiator.

22. The composition of claim 1, which has a molecular weight distribution of at least about 30.

23. The composition of claim 1, wherein the amount of said polymerization initiator is 0.02-1.0%, based on the total weight of the monomers.

24. The composition of claim 1, wherein said copolymer of lower molecular weight is a copolymer of styrene with an acrylate or a methacrylate, or both.

25. The composition of claim 1, wherein said polyfunctional polymerization initiator is a polymerization initiator having at least two peroxide groups.

* * * * *